(12) United States Patent
Yanagisawa

(10) Patent No.: US 7,477,240 B2
(45) Date of Patent: Jan. 13, 2009

(54) INPUT APPARATUS, COMPUTER APPARATUS, METHOD FOR IDENTIFYING INPUT OBJECT, METHOD FOR IDENTIFYING INPUT OBJECT IN KEYBOARD, AND COMPUTER PROGRAM

(75) Inventor: Takashi Yanagisawa, Yokohama (JP)

(73) Assignee: Lenovo Singapore Pte. Ltd., Singapore (SG)

( * ) Notice: Subject to any disclaimer, the term of this patent is extended or adjusted under 35 U.S.C. 154(b) by 319 days.

(21) Appl. No.: 10/489,590

(22) PCT Filed: Sep. 17, 2002

(86) PCT No.: PCT/JP02/09528

§ 371 (c)(1),
(2), (4) Date: Oct. 7, 2004

(87) PCT Pub. No.: WO03/027826

PCT Pub. Date: Apr. 3, 2003

(65) Prior Publication Data

US 2005/0030291 A1     Feb. 10, 2005

(30) Foreign Application Priority Data

Sep. 21, 2001    (JP) .............................. 2001-289306

(51) Int. Cl.
*G09G 5/00* (2006.01)
(52) U.S. Cl. .................................... 345/173; 178/18.03
(58) Field of Classification Search ......... 345/173–177; 178/18.01, 18.03, 18.09; D14/389
See application file for complete search history.

(56) References Cited

U.S. PATENT DOCUMENTS

| | | | | |
|---|---|---|---|---|
| 5,119,079 A | * | 6/1992 | Hube et al. ................... | 715/823 |
| 5,581,484 A | * | 12/1996 | Prince ......................... | 702/150 |
| 5,627,567 A | * | 5/1997 | Davidson ..................... | 345/173 |
| 5,748,512 A | * | 5/1998 | Vargas ......................... | 708/142 |
| 5,818,451 A | * | 10/1998 | Bertram et al. .............. | 715/840 |
| 6,023,265 A | * | 2/2000 | Lee .............................. | 345/173 |
| 6,040,824 A | * | 3/2000 | Maekawa et al. ............ | 345/173 |
| 6,073,036 A | * | 6/2000 | Heikkinen et al. .......... | 455/550.1 |
| 6,100,889 A | * | 8/2000 | Sciammarella et al. ...... | 715/815 |
| 6,211,856 B1 | * | 4/2001 | Choi et al. ................... | 345/666 |
| 6,424,338 B1 | * | 7/2002 | Anderson ..................... | 345/173 |

(Continued)

FOREIGN PATENT DOCUMENTS

JP        61-109131        5/1986

(Continued)

*Primary Examiner*—Richard Hjerpe
*Assistant Examiner*—Tom V Sheng
(74) *Attorney, Agent, or Firm*—Sawyer Law Firm; Carlos Munez-Bustam

(57) ABSTRACT

A method, computer program product, and device for identifying a target key for a touch input are provided. The method, computer program product, and device provide for detecting a first location at which a first touch input is made, determining a first identification area that includes the first location at which the first touch input is made, obtaining a relative location of the first touch input in the first identification area, detecting a second location at which a second touch input following the first touch input is made, and identifying a target key for the second touch input based on the relative location and a distance between the first and second locations.

16 Claims, 8 Drawing Sheets

U.S. PATENT DOCUMENTS 6,795,059 B2 * 9/2004 Endo .......................... 345/173

FOREIGN PATENT DOCUMENTS

| JP | 02-153415 | | 6/1990 |
| JP | 04191920 A | * | 7/1992 |
| JP | 06-095804 | | 4/1994 |
| JP | 07049749 A | * | 2/1995 |
| JP | 08063289 A | * | 3/1996 |
| JP | 2002-287907 | | 10/2002 |

* cited by examiner

[Figure 1]
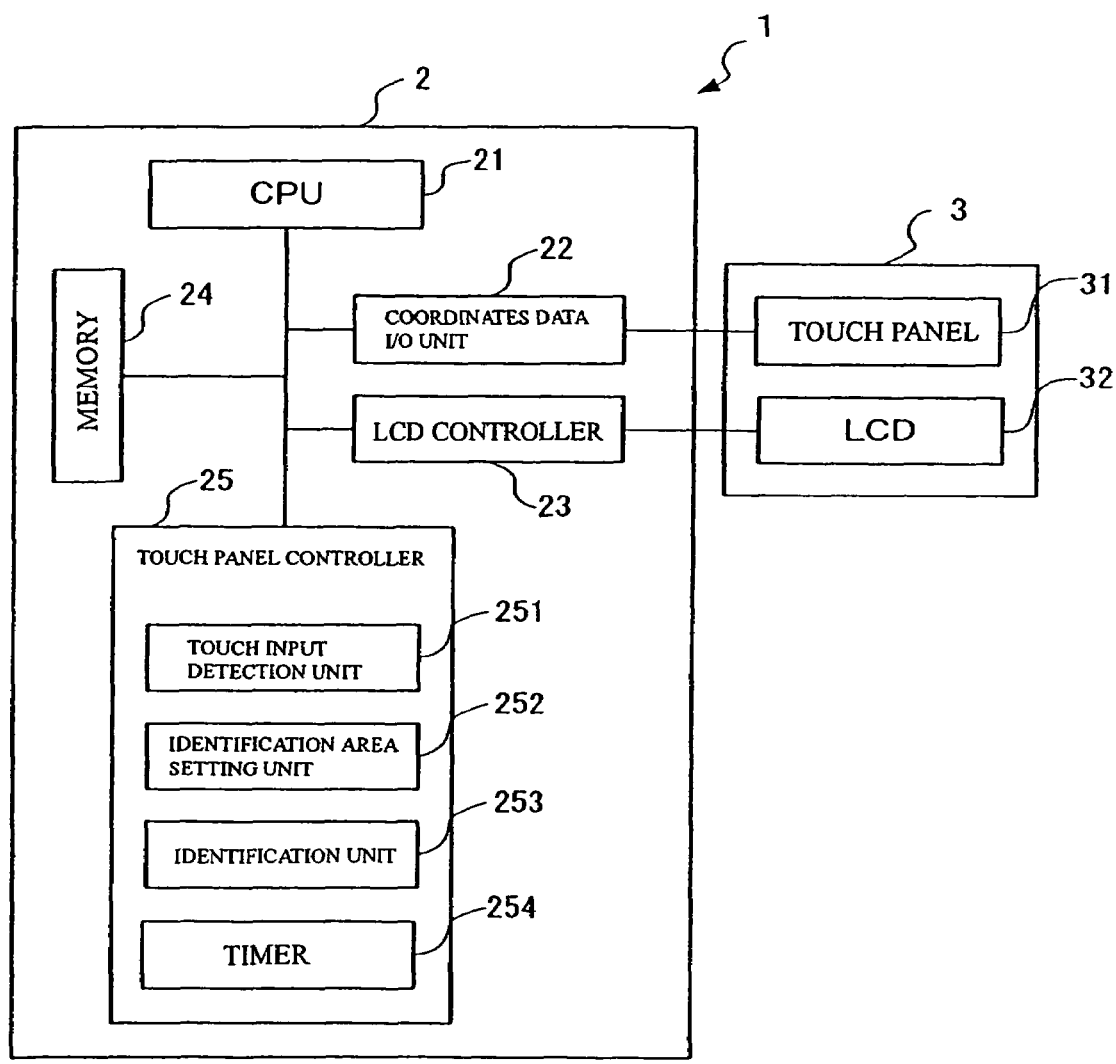

[Figure 2]
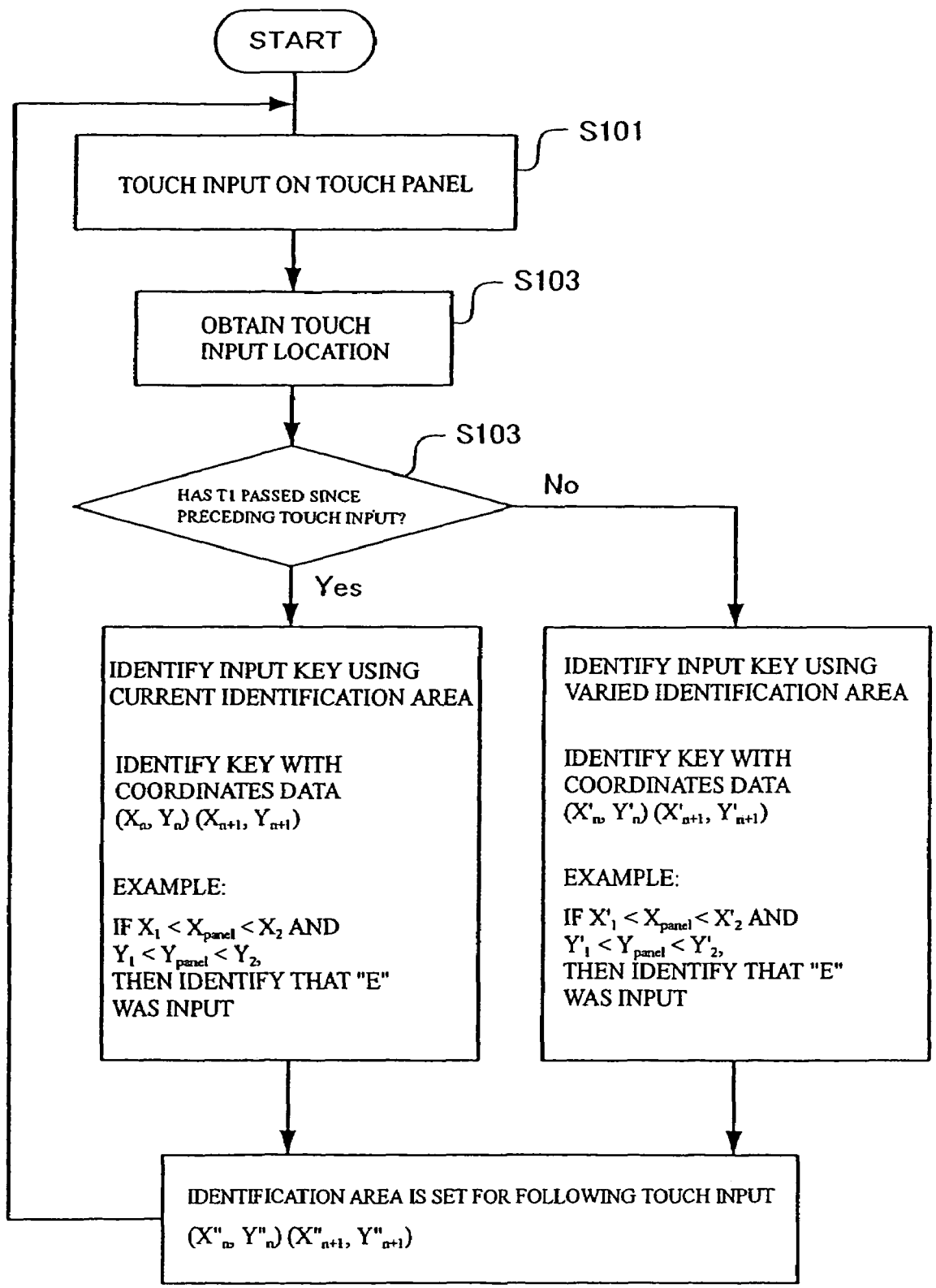

[Figure 3]
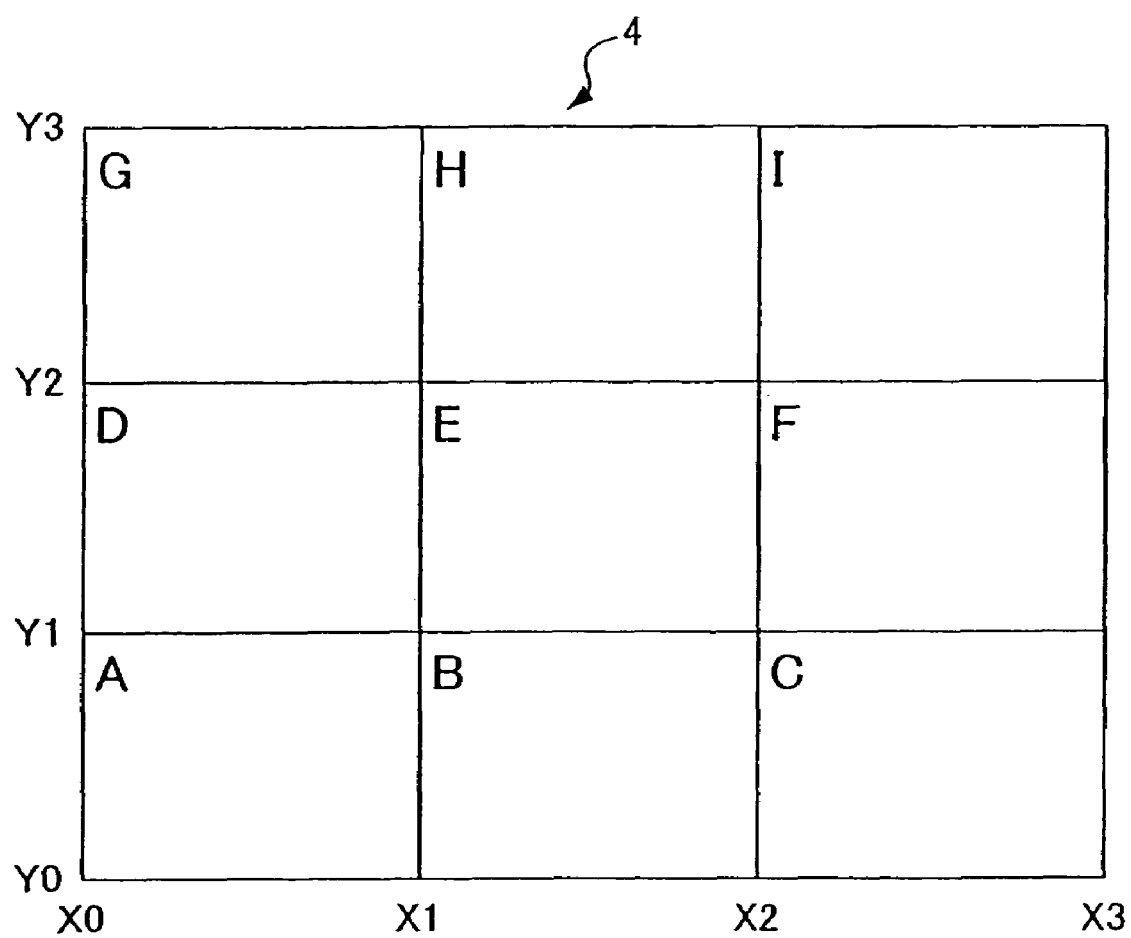

[Figure 4]
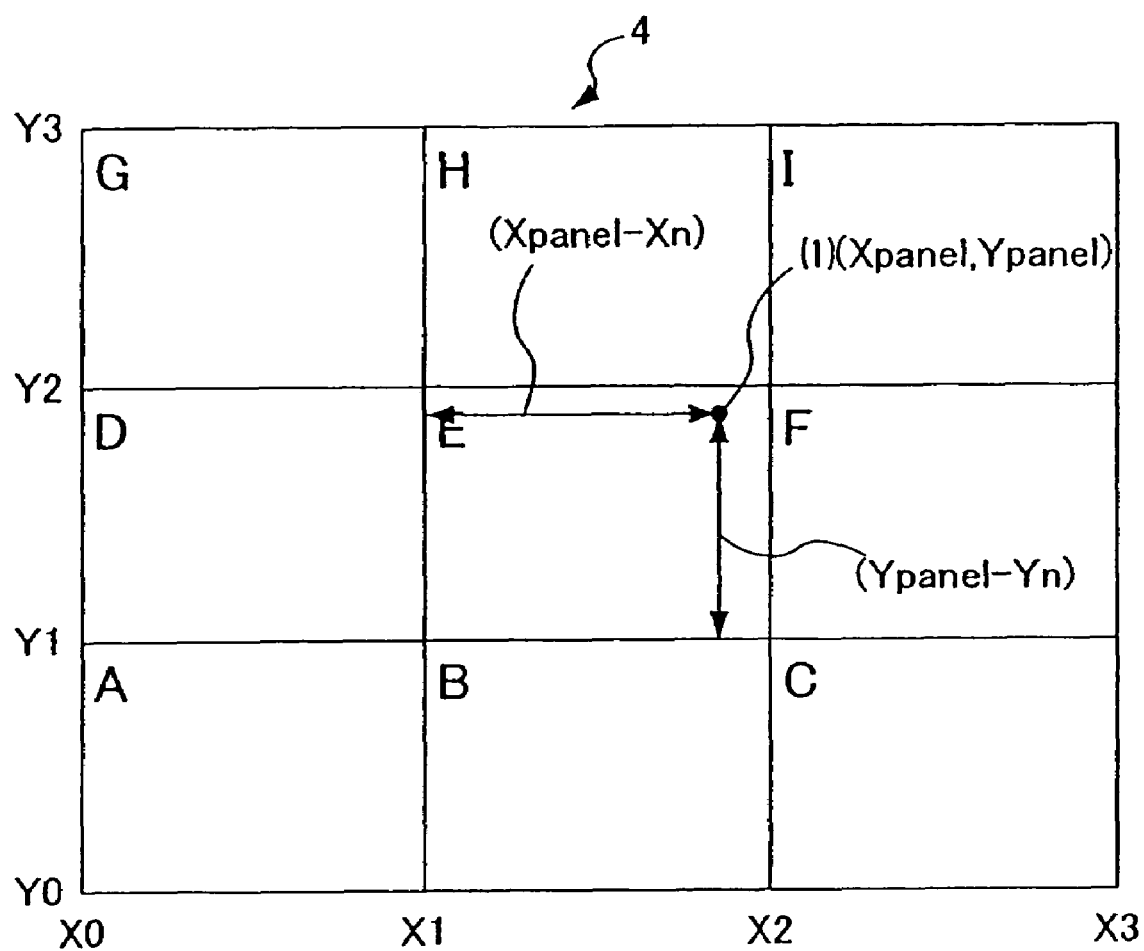

[Figure 5]
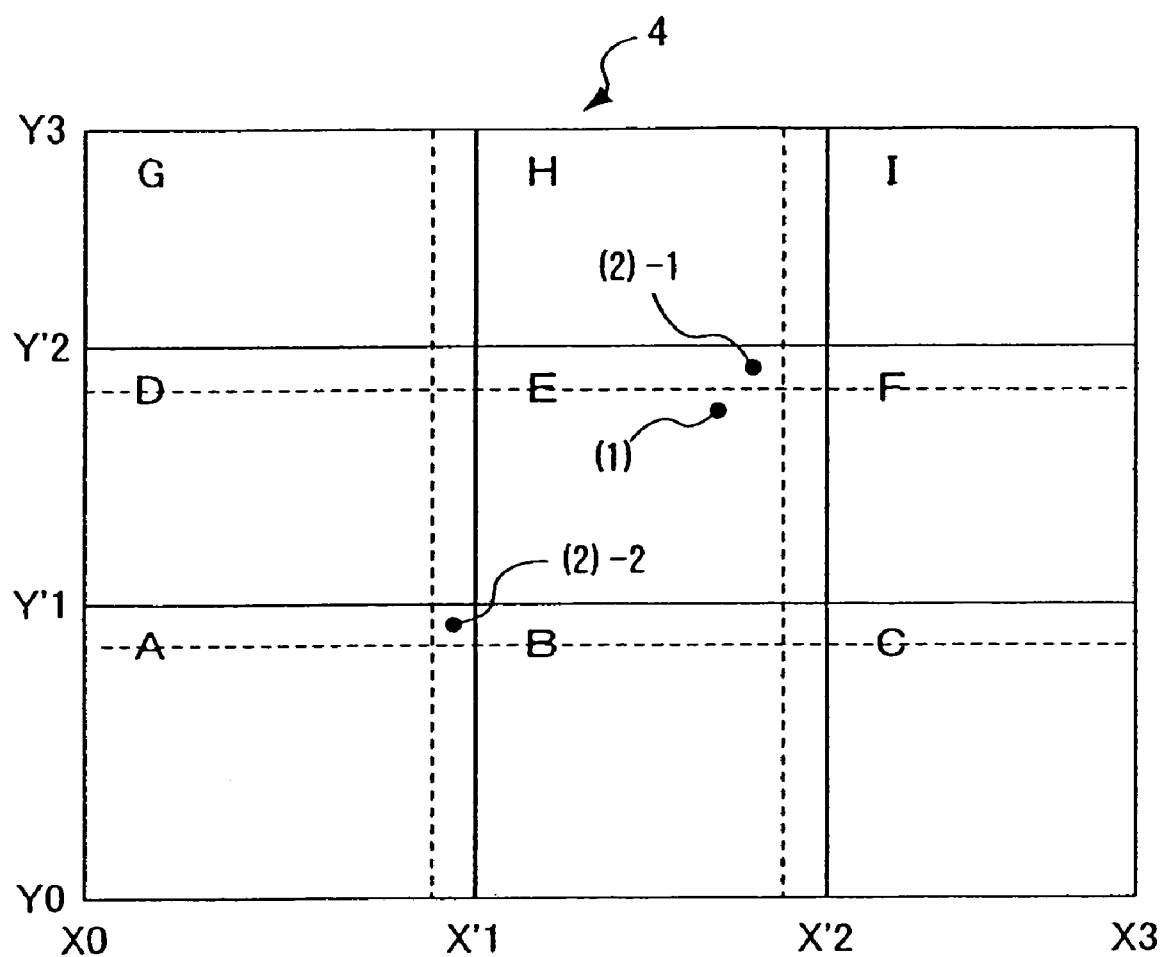

[Figure 6]
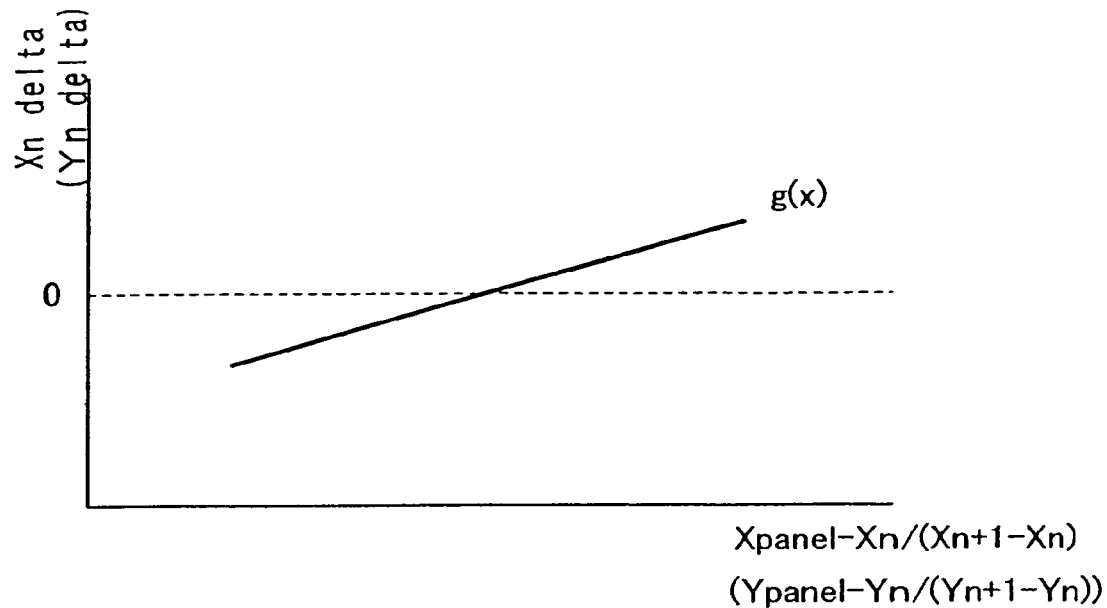
[Figure 7]
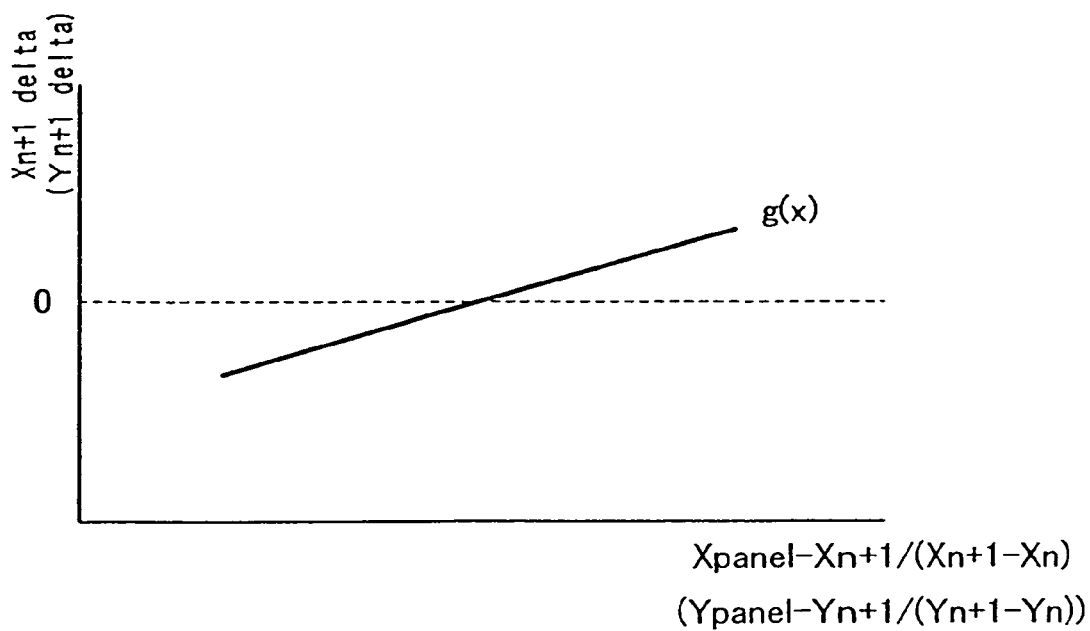

[Figure 8]
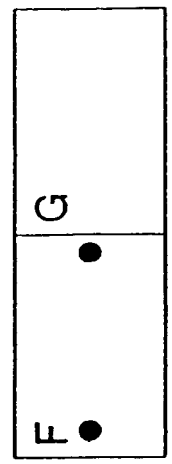
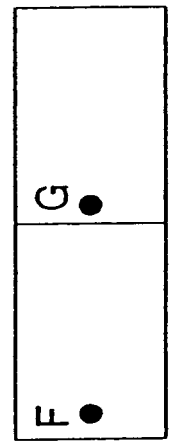
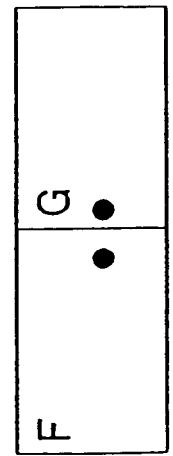

[Figure 9]
(a)
CASE I — F-F
CASE II — F-G
CASE III — F-G
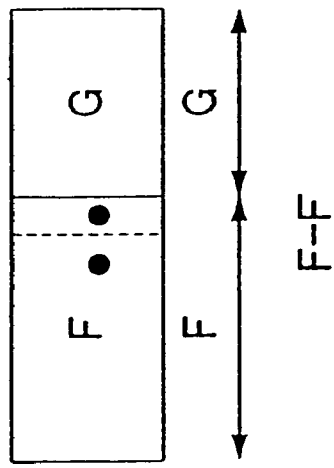
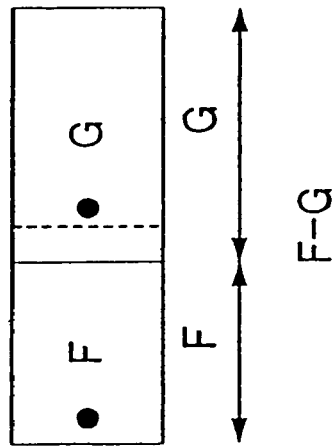
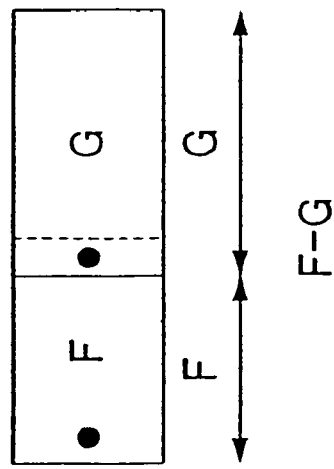
(c)
CASE I: F | G — F-F
CASE II: F | G — F-G
CASE III: F | G — F-G

INPUT APPARATUS, COMPUTER APPARATUS, METHOD FOR IDENTIFYING INPUT OBJECT, METHOD FOR IDENTIFYING INPUT OBJECT IN KEYBOARD, AND COMPUTER PROGRAM

FIELD OF THE INVENTION

This invention relates to a method for preventing incorrect inputs on a software-keyboard that uses a touch panel.

BACKGROUND ART

Software keyboards are used to display a keyboard arrangement on a screen of an LCD (Liquid Crystal Display) panel having touch panel functions and enable input of characters on behalf of a mechanical keyboard by using a coordinates detection function of the touch panel.

Unlike common hardware keyboards that involve strokes in the up-and-down (pressing) direction, software keyboards rely only on display on a flat screen, wherein boundaries among adjacent keys cannot be recognized by mechanical projections and depressions. Thus, incorrect inputs frequently occur especially on adjacent keys.

Methods for preventing or reducing such incorrect inputs have been proposed, such as the method of Japanese Patent Laid-Open No. 11-53093. The Japanese Patent Laid-Open No. 11-53093 proposes an input device comprising: a display unit having an input area for displaying a desired key arrangement and a display area for displaying characters and symbols; a data inputting unit for obtaining coordinates data when a key portion displayed in the input area of the display unit is selected; and a key input detection unit and controller for converting the coordinates data corresponding to the key portion selected in the input area into data representing a predetermined character or function, wherein a certain width of boundary areas are defined between the keys displayed in the input area, and if one of the boundary areas is selected, the key to which the boundary area belongs is determined, so that an input assigned to that determined key portion is performed. For example, the boundary areas are set to belong to the respective keys located at the left of them. Then, if a user touches a boundary area, it is determined that the input belongs to the key at the left of the boundary area.

Japanese Patent Laid-Open No. 11-127399 also proposes a method for preventing incorrect inputs in a remote control system that incorporates a touch panel. In this method, a predetermined width of intermediate band is provided among adjacent icons. This intermediate band is the area that does not reflect state transitions caused by selecting the icons. For example, in a remote control system for a video tape recorder, an icon A defines fast-forward while an icon B adjacent to the icon A defines rewind, wherein the intermediate band is provided in between the icons A and B. Here, when a user touches the icon A, fast-forward is selected. Then, if the user moves to the intermediate band to touch the icon B, the selected icon does not change, so that fast-forward remains to be selected.

With the method of the Japanese Patent Laid-Open No. 11-53093, determination that an incorrect input was performed due to a use's selection of a key adjacent to the correct key is made only when the user selects a certain key and then selects a backspace key and the key adjacent to that certain key. That is, determination that an incorrect input was performed requires the user to perform the additional key operation and to input the correct key.

With the method of the Japanese Patent Laid-Open No. 11-127399, if the user in the above example touches the intermediate band while, intending to touch the icon B for rewinding, the intention will not be reflected.

Thus, an object of this invention is to provide an input device that can prevent or reduce incorrect inputs on adjacent keys while reflecting the user's intention as much as possible without the need for additional key operations by the user.

SUMMARY OF THE INVENTION

There are several patterns of inputs on adjacent keys. These patterns will be described with reference to FIG. 8.

Now, consider the cases where the inputs are performed for two adjacent keys, F and G, as shown in FIG. 8. In FIG. 8, letters in the row (a) such as F-F indicate keys on which a user intends to perform input. For example, F-F indicates that the user intends to repeat input on the key "F" (case I), and F-G indicates that the user intends to perform input on the key "F" and then on the key "G" (case II and III).

The row (b) illustrates locations at which the user actually performed input (touched). The user performs key input according to the intentions indicated in the row (a), but, as illustrated in the row (b), he or she may fail to touch proper locations. Specifically, the case I shows that although the user intends to repeat input on the key "F", he or she first touches a location in the area of the key "F" near the boundary between the two keys "F" and "G" and then touches a location in the area of the key "G" near the boundary. The case II shows that although the user intends to perform input on the keys "F" and "G" successively, he or she first touches a location near the left edge of the key "F" and then touches a location in the area of the key "G" near the boundary between the two keys. The case III shows that although the user intends to perform input on the keys "F" and "G" successively, he or she first touches a location near the left edge of the key "F" and then touches a location in the area of the key "IF" near the boundary of the two keys.

The row (c) indicates identification results of the touches by the user. This identification results are based on the exact locations at which the user touched. The row (c) shows that, in the case I, the touches are identified as successive inputs on the key "F" and "G" contrary to the user's intention. In the case II, the touches are identified as successive inputs on the key "F" and "G" in accordance with the user's intention. In the case III, the touches are identified as successive inputs on the key "F" contrary to the user's intention.

In this way, there can be several cases for actual inputs on adjacent keys.

Here, it can be considered that the distance between the two touched locations reflects the user's intention, even if the actually touched keys do not match with the user's intention. That is, in the case I, where the user intends to touch the same key, the distance between the two locations is short; however, in the cases II and III, where the user intends to touch two adjacent keys, the distance between the two locations is long. In other words, around the boundary between the two keys, it can be considered that the user intends to touch the same key if the stroke between the two successive key operations is short, and that the user intends to touch two adjacent keys if the stroke is long.

This principle that the length of stroke between two successive key operations provides estimation of the user's intention can be used to prevent or reduce incorrect inputs that occur around the boundary between two keys. More specifically, incorrect inputs can be prevented or reduced by varying an identification boundary according to the touched location and by identifying the following touch input based on the varied boundary. This will be described with reference to FIG. 9.

FIG. 9 illustrates cases I through III similar to those of FIG. 8, in which the content of the row (a) is the same as that of FIG. 8. What are different from FIG. 8 are the rows (b) and (c). In the row (b), the boundary on the screen (the displayed boundary) between the two keys "F" and "G" is shown as a dashed line, and the boundary for identifying input that was varied according to the touched location is shown as a solid line.

In the case I of FIG. 9, in which the user touched a location near the displayed boundary, the boundary for identifying input is varied inside the area of the key "G". Therefore, the following touch is also identified as an input on the key "F".

Thus, successive inputs on the key "F" can be identified, so that the identification result for the case I matches with the user's intention.

In the cases II and III of FIG. 9, in which the user touched a location near the left edge of the key "F", the boundary for identifying input is varied inside the area of the key "F". Thus, successive inputs on the key "F" and "G" can be identified, so that the identification results for the cases II and III match with the user's intention.

This invention comprises an input device based on this concept that the identification boundary is varied according to the touched location. The input device comprises: a display unit for displaying a plurality of keys, each defined in a predetermined range; an area setting unit for setting an identification area for each of the keys to identify a target key for a touch input, and for varying an identification area for a certain key based on the location at which the first preceding touch input is made; and an identification unit for identifying a target key for the second touch input following the first touch input based on the location at which the second touch input is made and the varied identification area.

The input device according to this invention can vary the identification area for a certain key based on the location at which the first preceding touch input is made. Thus, incorrect inputs can be reduced or prevented as described with reference to FIGS. 8 and 9.

In the input device according to the invention, the area setting unit can vary the identification area for a key corresponding to the identification area that includes the location at which the first touch input is made. This is done for reducing or preventing incorrect inputs due to the second touch input following the first input on the key in question. Once the identification area is established, touch inputs at any location within the identification area are recognized as inputs on the same key.

In the input device according to the invention, the area setting unit preferably varies the identification area so that the identification area reflects the pitch between the keys.

Thus, the object of the input device of this invention is to reduce or prevent incorrect inputs due to the first and second touch inputs performed successively. Therefore, this invention can be activated for a predetermined period between the two inputs that permits the two inputs to be varied as successive inputs. Then, the input device according to this invention can allow the identification area to be varied for the predetermined period after the preceding first touch input. The predetermined period will be derived from analysis of actual touch inputs.

As described with reference to FIGS. 8 and 9, determination whether the successive touch inputs are being performed for the same key or two adjacent keys can be based on the distance between the preceding touch input and the following touch input. That is, in FIGS. 8 and 9, it can be considered that the successive touch inputs are intended for the same key if the distance between the preceding touch input and the following touch input is short as in the case I. On the other hand, it can be considered that the successive touch inputs are intended for two adjacent keys if the distance is long as in the cases II and III. Thus, this invention provides an input device comprising: a display unit for displaying a plurality of keys arranged with a predetermined key pitch; and an identification unit for identifying a target key for the following touch input based on the distance between the preceding touch input and the following touch input on the display unit.

According to this invention, the distance between the preceding and following touch inputs is principally based on the distance in the direction of the key arrangement. Therefore, identification for the horizontally arranged keys will be based on the horizontal distance, while identification for the vertically arranged keys will be based on the vertical distance.

The key pitch is taken into consideration when the user moves an input means such as his or her finger or a pen in performing touch input. Therefore, if the distance between the preceding and following touch inputs is shorter than a predetermined value based on the key pitch, the identification unit can identify the preceding touch input and the following touch input as inputs performed for the same key regardless of the location of the following touch input. Also, if the distance between the preceding and following touch inputs is longer than a predetermined value based on the key pitch, the identification unit can identify the preceding touch input and the following touch input as inputs performed for different keys respectively, regardless of the location of the following touch input. The distance between the preceding and following touch inputs should be determined based on the horizontal or vertical distance in the key arrangement.

On software keyboards in computer devices, identification of a target key for a touch input is done by comparing position coordinates of the touch input with position coordinates of the identification area. Therefore, to prevent incorrect inputs, the identification area can be set according to coordinates data determined based on the touched location. Thus, this invention provides a computer device comprising: a display unit for displaying a software keyboard on which a plurality of keys are arranged, each key having an identification area defined by first coordinates data; a detection unit for detecting a touched location on the software keyboard; and an identification area setting unit for setting second coordinates data that defines the identification area based on the touched location.

In the computer device according to this invention, where the touch input is made in the identification area should be taken into consideration in setting the second coordinates data. The reason for this is apparent from referring the cases I through III of FIG. 9. Thus, in this invention, the identification area setting unit can set the second coordinates data to be different from the first coordinates data based on the relative location of the touched location in the identification area. Here, as described above, this invention effectively works when the preceding and following touch inputs can be regarded as successive inputs. Therefore, to serve the spirit of this invention, the identification area setting unit clears the setting of the second coordinates data after a predetermined period and reactivates the identification area according to the first coordinates data.

In the computer device according to this invention, if the touched location is at about the center of the current identification area, the identification area possibly need not to be varied. Therefore, in the computer device according to this invention, the identification area setting unit may set the second coordinates data to be identical with the first coordinates data based on the relative location of the touched location in the identification area. Thus, the first and second coordinates data may be identical or different depending on the relative location of the touched location in the identification area.

The computer device according to this invention effectively operates by comprising an identification unit for identifying a target key for the first preceding key touch based on the identification area defined by the first coordinates data. The identification unit can also identify a target key for the second key touch following the first key touch based on the identification area defined by the second coordinates data.

This invention provides a method for identifying a target key for an input, wherein the method can be applied to the above described input device or computer device. The method comprises: setting a plurality of identification areas on an input surface for identifying a target key for a touch input; detecting an identification area in which the touch input is made; and based on the detection result, identifying the target key for the touch input, wherein boundaries that form the identification area are varied based on the touch input location at which the touch input is made.

It has been described that the second coordinates data can be set to be different from the first coordinates data based on the relative location of the touch input location in the identification area. It is also possible to consider the relative location of the touch input location in the identification area as the distance from the boundaries that form the identification area. Therefore, in the identification method according to this invention, the boundaries can be varied based on the distance from the touch input location to the boundaries. As a specific embodiment, the boundaries can be varied such that the boundary closer to the touch input location becomes farther from the touch input location. The boundary can also be varied such that the boundary farther from the touch input location becomes closer to the touch input location.

In the method according to this invention for identifying a target key for an input, when the following touch input is made within a predetermined period after the preceding touch input, the target key for the following touch input is identified based on the new identification area formed by the boundaries varied according to the preceding touch input. In this way, incorrect inputs are reduced or prevented.

This invention provides a computer program that causes a computer device to execute the above described method for identifying a target key for an input. The computer program causes the computer device to execute the processing of: setting a plurality of identification areas on an input surface for identifying a target key for a touch input; detecting an identification area in which the touch input is made; identifying, based on the detection result, the target key for the touch input; and varying, based on the touch input location in the identification area in which the touch input is made, boundaries that form the identification area.

This invention also provides a method for identifying a target key for an input on a software keyboard. That is, this invention comprises a method for identifying a target key for an input on a software keyboard, comprising: detecting a first location at which the first preceding touch input is made; determining a first identification area that includes the first location at which the first touch input is made; obtaining a relative location of the first touch input location in the identification area; detecting a second location at which the second touch input that follows the first touch input is made; and identifying the target key for the second touch input based on the relative location and the distance between the first and second locations.

According to this method for identifying a target key for an input, if the first touch input is made on a first key displayed on the software keyboard and the second touch input is made on a second key adjacent to the first key, the target key for the second touch input can be identified as the first key based on the above mentioned relative location and the distance between the first and second locations. Further, if the first touch input is made on a first key displayed on the software keyboard and the second touch input is made on the first key, the target key for the second touch input can be identified as a second key adjacent to the first key based on the above mentioned relative location and the distance between the first and second locations.

BRIEF DESCRIPTION OF THE DRAWINGS

FIG. 1 is a block diagram illustrating a basic configuration of a computer device according to an embodiment;

FIG. 2 is a flowchart illustrating operations for identifying an input key in the computer device according to the embodiment;

FIG. 3 illustrates a typical software keyboard of the computer device according to the embodiment;

FIG. 4 illustrates a typical software keyboard of the computer device according to the embodiment;

FIG. 5 illustrates a typical software keyboard of the computer device according to the embodiment;

FIG. 6 is a graph showing a function for adjusting an identification area of the computer device according to the embodiment;

FIG. 7 is a graph showing a function for adjusting an identification area of the computer device according to the embodiment;

FIG. 8 illustrates patterns of touch inputs on adjacent input keys; and

FIG. 9 illustrates patterns of touch inputs on adjacent input keys.

PREFERRED EMBODIMENT

Now, the invention will be described according to an embodiment.

FIG. 1 is a block diagram illustrating a configuration of a computer device 1 according to the embodiment. As shown in FIG. 1, the computer device 1 is basically configured with a computer device main body 2 and a display unit 3.

The computer device main body 2 includes a CPU 21, a coordinates data acquisition unit 22, an LCD controller 23, memory 24, and a touch panel controller 25.

The CPU 21 is a central processing unit for controlling the entire computer device 1, and it is responsible for processing touch input performed on a touch panel 31 and displaying images' on an LCD 32 based on programs stored in the memory 24.

The coordinates data acquisition unit 22 detects data resulting from a user's touch input onto the touch panel 31 and converts the data into digital coordinates data.

The LCD controller 23 reads out image data written by the CPU 21 in image memory (not shown) and outputs it on the LCD 32. The LCD controller 23 also causes a software keyboard to be displayed on the LCD 32.

The memory 24 a computer-readable medium, is used for storing programs and data relating to the operation of the computer device 1. For example, the memory 24 can be embodied in semiconductor memory, or in an external storage device such as a hard disk drive. These programs include a program for executing a key identification procedure for touch input.

The touch panel controller 25 includes a touch input detection unit 251, an identification area setting unit 252, an identification unit 253, and a timer 254 in order to perform processing according to a user's touch input on the touch panel 31.

The touch input detection unit 251 obtains coordinates data acquired by the coordinates data acquisition unit 22 (this coordinates data is hereafter referred to as "input coordinates data"). The obtained input coordinates data is output to the identification area setting unit 252 and the identification unit 253. The touch input detection unit 251 also calculates an adjustment value for key boundaries based on coordinates data of an input key identified by the identification unit 253 and the input coordinates data. As will be described in detail below, the key boundaries, i.e., the identification areas vary depending on this adjustment value.

The identification area setting unit 252 sets a new identification area based on the adjustment value for the key boundary calculated by the touch input detection unit 251 and the current identification area. The new identification area may be identical with or different from the current identification area.

The identification unit 253 compares the input coordinates data obtained from the touch input detection unit 251 with the identification area that has been set by the identification area setting unit 252 to identify a key for which a user's input is intended.

The timer 254 measures the interval between touch inputs.

The display unit 3 is used for displaying characters and symbols, and it is configured with the LCD 32 having a screen that displays characters and symbols, and the touch panel 31 superimposed on the LCD 32. For example, an analog resistant film touch panel can be used as the touch panel 31. The LCD 32 displays a software keyboard, on which a user can input desired characters or symbols by touching the corresponding locations. Input on the touch panel 31 can be performed using an input pen as a pointing device.

The display unit 3 displays a software keyboard 4 illustrated in FIG. 3. It should be understood that although the software keyboard 4 is illustrated as a matrix of nine input keys from A to I in FIG. 3, this is a mere example and other arrangement can also be adopted. Further, X0 through X3 and Y0 through Y3 in FIG. 3 are coordinates data for specifying the nine input keys. For example, the input key A in FIG. 3 can be defined by four coordinates data X0, X1, Y0, and Y1. That is, in the state of FIG. 3, a touch input performed in the area enclosed by the coordinates data X0, X1, Y0, and Y1 is identified as an input on the input key A. Thus, the area enclosed by the coordinates data X0, X1, Y0, and Y1 is the current identification area for the input key A. In addition, the lines indicating the identification areas are considered as boundaries forming the identification areas.

Assume that a user performed touch-input on the software keyboard 4 at the location (Xpanel, Ypanel) shown in FIG. 4. This (Xpanel, Ypanel) is the input coordinates data. At this point, the key identified due to this touch input is the input key E, which is defined by the coordinates data X1, X2, Y1, and Y2. That is, the area enclosed by this coordinates data is the identification area corresponding to the input key E. In this embodiment, the difference between the input coordinates data and the coordinates data defining the input key is standardized by the interval of the input keys (key pitch) to obtain an input value, which is used to calculate an adjustment value (varying value) for the boundaries of the input key. An example of the functions for calculating the adjustment value that reflects the key pitch is shown in FIG. 6. The function of FIG. 6 shows that the adjustment value (Xn delta, Yn delta) varies depending on the relative location of a touch input lication in the identification area. The coordinates data to be used for the following touch input (X'n, Y'n) is given by the sum of the preceding key's coordinates data and the adjustment value; thus (X'n, Y'n)=(Xn+Xn delta, Yn+Yn delta). This means that the identification area is set based on the touch input location.

As shown in FIG. 7, the adjustment value for the other coordinates data for identifying the input key can also be calculated based on the function similar to the above function.

That is, the value is determined by calculating Xn+1 delta and Yn+1 delta with the function shown in FIG. 7; thus (X'n+1, Y'n+1)=(Xn+Xn+1 delta, Yn+Yn+1 delta).

FIG. 5 illustrates the identification areas set to reflect the adjustment value described above. In FIG. 5, the dashed lines indicate the original identification areas, and the solid lines indicate the adjusted identification areas. As described above, these new identification areas are used to identify the target input key for the following touch input.

The black dot labeled (1) in FIG. 5 indicates the location at which the preceding touch input is made. This preceding touch input is made in the upper right quadrant of the center of the original identification area. The varied identification area that reflects this relative location of the touch input location in the original identification area has been moved in the upper right direction. In terms of the boundaries forming the identification area, X1 and X2 has been shifted to the right to be X'1 and X'2 respectively, and Y1 and Y2 has been shifted upward to be Y'1 and Y'2 respectively. As to the relation between the shifts in the boundaries and the location of the preceding touch input, the boundary closer to the touch input location (X2,Y2) has been shifted to be farther from the touch input location, and the boundary farther from the touch input location (X1, Y1) has been shifted to be closer to the touch input location. Thus, it can be seen that the boundaries has been varied based on the distance between the touch input location and the boundaries forming the identification area.

The above description has been made for the input key E, but it is also applied to the other input keys.

Identification of an input key based on the varied identification areas are allowed only for a predetermined period, because the varied identification areas according to this embodiment operate only on successive touch inputs. Thus, the varied identification areas are active only for a predetermined period after the preceding touch input. Once the predetermined period has passed, the varied identification areas are cleared, and the original identification areas indicated with the solid lines are reactivated for identification.

In FIG. 5, (2)-1 and (2)-2 indicate locations at which the following touch inputs were performed. Here, for example, the identification areas have been set as indicated by the solid lines based on the preceding touch input performed at the location (1). The following touch input (2)-1 was performed on the input key H adjacent to the input key E in terms of the original identification areas. However, in terms of the varied identification areas indicated by the solid lines, this input is regarded as a touch input in the identification area corresponding to the input key E. Thus, the touch input at (2)-1 identifies the input key E. On the other hand, the following touch input (2)-2 was performed on the input key E in terms of the original identification areas. However, in terms of the varied identification areas indicated by the solid lines, this input is regarded as a touch input in the identification area corresponding to the input key A.

As described above, the distance between two touch inputs is short when a user intends to touch one key successively, while the distance is long when a user intends to touch two adjacent keys successively. The example illustrated in FIG. 5 agrees with this principle. That is, the distance between the preceding touch input (1) and the following touch input (2)-1 is short, and based on this distance, the input key E is identified although the touch input is made on the adjacent input key H. It should be understood that the relative location of the touch input (1) in the original identification area also concerns the identification of the following touch input, since the varied identification area has been defined based on the relative location of the touch input (1). On the other hand, the distance between the preceding touch input (1) and the following touch input (2)-2 is long, and based on this distance, the input key A adjacent to the input key E is identified although the touch input is made on the input key E in terms of the original identification areas.

This determination whether the distance is short or long can be based on the key pitch. For example, if the distance between the two key touches is shorter than 10% of the key pitch, those successive touch inputs can be identified as inputs for the same input key, regardless of the actually touched input keys. On the other hand, for example, if the distance between the two key touches is longer than 80% of the key pitch, those successive touch inputs can be identified as inputs for two adjacent keys, regardless of the actually touched input keys.

Now, the procedure for identifying an input key in the computer device 1 will be described with reference to the flowchart illustrated in FIG. 2.

When a touch input (second touch input) is performed on the touch panel (S101 in FIG. 2), the touch input detection unit 251 obtains the touch input location as the coordinates data ("input coordinates data") (S103 in FIG. 2). This touch input is the following touch input.

The timer 254 has been measuring the time since the preceding touch input (first touch input) (S105 in FIG. 2). Based on this measurement by the timer 254, if a predetermined time (T1) has passed since the first touch input, the input key is identified using the current identification area (S107 in FIG. 2). Otherwise, the input key is identified using the identification area varied after the first touch input (S109 in FIG. 2).

Now, at S107, the input key is identified by comparing the input coordinates data with the coordinates of the current identification area, where the current identification area is (Xn, Yn) (Xn+1, Yn+1), and n=1. For example, if X1<Xpanel<X2, and Y1<Ypanel<Y2, where the input coordinates data is (Xpanel, Ypanel), then the input key E is identified as the target key for the input. On completion of this identification, the process proceeds to S111 in FIG. 2.

On the other hand, at S109, the input key is identified by comparing the input coordinates data with the coordinates of the identification area varied according to the first touch input, where the shifted identification area is (X'n, Y'n) (X'n+1, Y'n+1), and n=1. If X'1<Xpanel<X'2, and Y'1<Ypanel<Y'2, where the input coordinates data is (Xpanel, Ypanel), then the input key E is identified as the target key for the input. On completion of this identification, the process proceeds to S111 in FIG. 2.

At S111, the identification area is set according to the second touch input. This is done for identifying the third touch input following this second touch input. The identification area is then set to be (X"n, Y"n) (X"n+1, Y"+1). This identification area is determined by adding the above described adjustment value to the identification area varied according to the first touch input, (X'n, Y'n) (X'n+1, Y'n+1).

These operations are repeated in every touch input on the touch panel hereafter. In this process, the identification areas corresponding to the input keys including the input key in question are varied based on the location of the preceding touch input. Then, the varied identification areas are used to identify the following touch input. Thus, improved accuracy of identification of successive touches on the same input key or adjacent input keys is provided.

In the above embodiment, the variation of the identification area is derived from the functions shown in FIGS. 6 and 7. However, it is also possible to have a table of variations for the identification areas (boundaries) corresponding to the location of the preceding touch input and to determine the identification area for identifying the following touch input based on the table. It should also be understood that although the above embodiment illustrates successive inputs in the direction of rows of the key arrangement (horizontal direction) as an example, it can also adapt to successive inputs in the direction of columns of the key arrangement (vertical direction). Further, although description has been made only about successive touch inputs for adjacent keys, this invention is not limited to it. For example, for the input key A in FIG. 4, this invention can be applied to inputs at locations such as the input key C or H.

ADVANTAGES OF THE INVENTION

As described above, this invention enables incorrect inputs on adjacent keys to be prevented or reduced while reflecting the user's intention as much as possible.

The invention claimed is:

1. An input device comprising:
   a display unit for displaying a plurality of keys arranged with a predetermined key pitch; and
   an identification unit for identifying a target key for a following touch input based on a distance between a preceding touch input and the following touch input on the display unit,
   wherein, if the distance is shorter than a predetermined value based on the key pitch, the identification unit identifies the preceding touch input and the following touch input as inputs performed for a same key regardless of the location of the following touch input,
   wherein, if the distance is longer than the predetermined value, the identification unit identifies the preceding touch input and the following touch input as inputs performed for different keys respectively, regardless of the location of the following touch input.

2. The input device according to claim 1, wherein the identification unit takes a horizontal distance or a vertical distance in the key arrangement as the distance.

3. A method for identifying a target key for a touch input, the method comprising:
   setting a plurality of identification areas on an input surface for identifying the target key for the touch input;
   detecting an identification area in which the touch input is made; and
   identifying the target key for the touch input based on the identification area detected,
   wherein boundaries that form the identification area are varied based on a location in the identification area in which the touch input is made and the distance from the touch input location to the boundaries.

4. The method according to claim 3, wherein the boundaries are varied such that a boundary closer to the touch input location becomes farther from the touch input location, and a boundary farther from the touch input location becomes closer to the touch input location.

5. The method according to claim 3, further comprising:
identifying a target key for a following touch input based on a new identification area formed by the boundaries varied according to the touch input when the following touch input is made within a predetermined period after the touch input.

6. A method for identifying a target key for a touch input on a software keyboard, the method comprising:
detecting a first location at which a first touch input is made;
determining a first identification area that includes the first location at which the first touch input is made;
obtaining a relative location of the first touch input in the first identification area;
detecting a second location at which a second touch input following the first touch input is made; and
identifying a target key for the second touch input based on the relative location and a distance between the first and second locations.

7. The method according to claim 6, wherein, if the first touch input is made on a first key displayed on the software keyboard and the second touch input is made on a second key adjacent to the first key, the target key for the second touch input is identified as the first key based on the relative location and the distance between the first and second locations.

8. The method according to claim 6, wherein, if the first touch input is made on a first key displayed on the software keyboard and the second touch input is made on the first key, the target key for the second touch input is identified as a second key adjacent to the first key based on the relative location and the distance between the first and second locations.

9. A computer-implemented method for identifying a target key for a touch input, the method comprising:
displaying a plurality of keys arranged with a predetermined key pitch on a display unit; and
identifying a target key for a following touch input based on a distance between a preceding touch input and the following touch input on the display unit,
wherein, if the distance is shorter than a predetermined value based on the key pitch, the identification unit identifies the preceding touch input and the following touch input as inputs performed for a same key regardless of the location of the following touch input,
wherein, if the distance is longer than the predetermined value, the identification unit identifies the preceding touch input and the following touch input as inputs performed for different keys respectively, regardless of the location of the following touch input.

10. The computer-implemented method according to claim 9, wherein the distance is a horizontal distance or a vertical distance in the key arrangement.

11. A computer-readable medium storing a computer program, which when executed, implement instructions for:
setting a plurality of identification areas on an input surface for identifying the target key for the touch input;
detecting an identification area in which the touch input is made; and
identifying the target key for the touch input based on the identification area detected,
wherein boundaries that form the identification area are varied based on a location in the identification area in which the touch input is made and the distance from the touch input location to the boundaries.

12. The computer-readable medium storing a computer program, according to claim 11, wherein the boundaries are varied such that a boundary closer to the touch input location becomes farther from the touch input location, and a boundary farther from the touch input location becomes closer to the touch input location.

13. The computer-readable medium storing a computer program, according to claim 11, wherein the computer-readable medium further comprises instructions for:
identifying a target key for a following touch input based on a new identification area formed by the boundaries varied according to the touch input when the following touch input is made within a predetermined period after the touch input.

14. A computer-readable medium storing a computer program, which when executed, implement instructions for:
detecting a first location at which a first touch input is made;
determining a first identification area that includes the first location at which the first touch input is made;
obtaining a relative location of the first touch input in the first identification area;
detecting a second location at which a second touch input following the first touch input is made; and
identifying a target key for the second touch input based on the relative location and a distance between the first and second locations.

15. The computer-readable medium storing a computer program, according to claim 14, wherein, if the first touch input is made on a first key displayed on a software keyboard and the second touch input is made on a second key adjacent to the first key, the target key for the second touch input is identified as the first key based on the relative location and the distance between the first and second locations.

16. The computer-readable medium storing a computer program, according to claim 14, wherein, if the first touch input is made on a first key displayed on a software keyboard and the second touch input is made on the first key, the target key for the second touch input is identified as a second key adjacent to the first key based on the relative location and the distance between the first and second locations.

* * * * *